(No Model.)

W. H. DODGE.
BAND SAW MACHINE.

No. 294,452. Patented Mar. 4, 1884.

UNITED STATES PATENT OFFICE.

WALLACE H. DODGE, OF MISHAWAKA, INDIANA.

BAND-SAW MACHINE.

SPECIFICATION forming part of Letters Patent No. 294,452, dated March 4, 1884.

Application filed July 5, 1883. (No model.)

*To all whom it may concern:*

Be it known that I, WALLACE H. DODGE, of Mishawaka, in the county of St. Joseph and State of Indiana, have invented a new and useful Improvement in Band-Saw Machines; and I do hereby declare that the following is a full and accurate description of the same.

Band-saws frequently run off the band-wheels, and are then liable to be greatly damaged by being kinked or broken. To obviate this damage, grooved wheels have been employed, and pins have been set in the frame to catch the saw when it runs off. The first named is objectionable, as it renders it more difficult to put the saw in place, and because of the edge friction, and the last named is objectionable because they are not adjustable, and because they are not efficient.

My invention consists of a semicircular flanged plate, in radius a little less than the band-wheel, and placed beside the upper band-wheel, so that when the saw runs off its wheel it will pass onto and be caught by said plate, and supported in substantially the same curved form as when on the wheel.

That others may fully understand my invention, I will particularly describe it, having reference to the accompanying drawings, wherein—

Figures 1, 2:
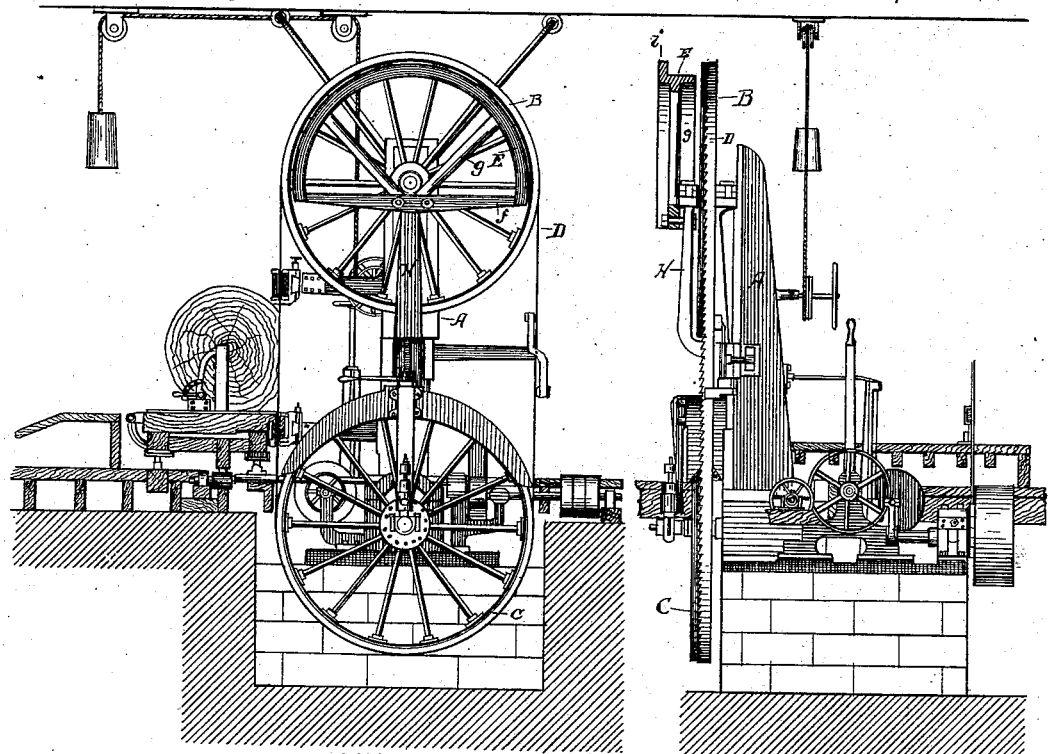
Figure 3:
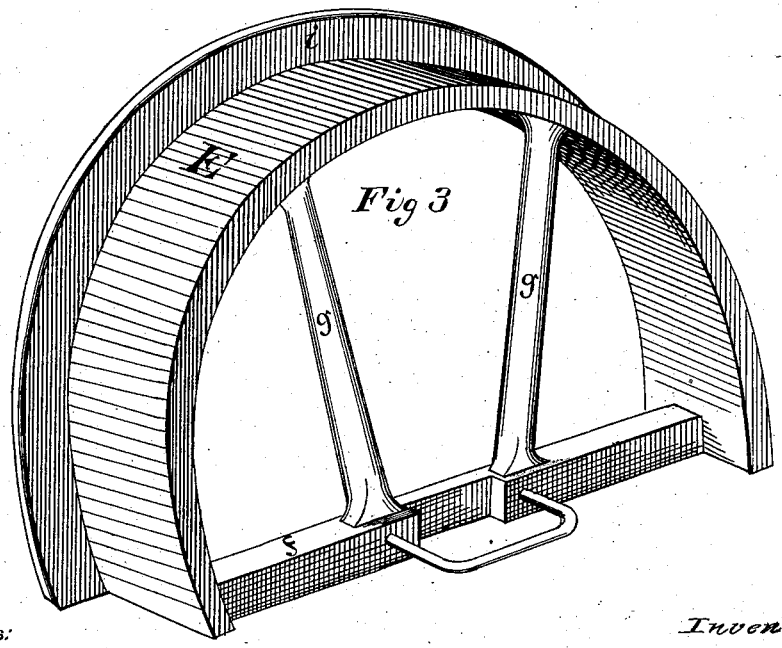

Figure 1 represents my invention in perspective in operative position. Fig. 2 is a side elevation of a band-saw machine with my device thereto attached. Fig. 3 illustrates the catcher detached.

A is the frame of the band-saw machine. This may be of any proper pattern or size. It is immaterial to my invention what particular style of frame or accessories may be employed.

B C are the upper and lower band-wheels, respectively.

D is the band-saw.

The catcher E is a semicircular plate mounted upon arms $f$ $g$, and provided with a suitable means of attachment to the frame, or preferably to the bracket H, whereon the bearing for the upper wheel, B, is supported. It is then adjusted with the wheel B without special attention. The plate E is preferably provided with a flange, $i$, which will prevent the saw from passing over and off the catcher when it has left the band-wheel. As this catcher is semicircular, and but little less in radius than the band-wheel, the saw will be supported in the same form almost as before it left the band-wheel, and therefore without any liability to kink or receive other damage.

Having described my invention, what I claim as new is—

1. The combination, with the frame A and band-wheels of a band-saw machine, of a stationary catcher, E, located near the upper band-wheel of said machine, to catch the saw if it runs off said wheel, substantially as and for the purpose described.

2. In a band-saw machine, the frame A and the band-wheels mounted thereon, combined with the catcher-plate E, slightly smaller in radius than said band-wheels, and permanently attached to the saw-frame or band-wheel bracket.

3. The frame A and band-wheels mounted thereon, combined with the flanged semicircular plate E, mounted upon the arms $f$ $g$, and attached to the band-wheel bracket H, so as to stand close to the band-wheel B, for the purpose of catching and supporting the saw when it shall run off said wheel.

WALLACE H. DODGE.

Witnesses:
WILL W. DODGE,
CHAS. ENDLICH.